United States Patent
Hausrath et al.

(10) Patent No.: US 11,063,278 B2
(45) Date of Patent: Jul. 13, 2021

(54) METHOD FOR MAKING CONTACT WITH A PLURALITY OF SEPARATOR PLATES AND FUEL CELL SYSTEM

(71) Applicant: Bayerische Motoren Werke Aktiengesellschaft, Munich (DE)

(72) Inventors: Marco Hausrath, Munich (DE); Florian Kriesch, Feldkirchen-Westerham (DE); Stefan Haase, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 159 days.

(21) Appl. No.: 16/210,323

(22) Filed: Dec. 5, 2018

(65) Prior Publication Data

US 2019/0109337 A1 Apr. 11, 2019

Related U.S. Application Data

(63) Continuation of application No. PCT/EP2017/060674, filed on May 4, 2017.

(30) Foreign Application Priority Data

Jun. 10, 2016 (DE) ...................... 10 2016 210 316.4

(51) Int. Cl.
*H01M 8/04537* (2016.01)
*H01M 8/2465* (2016.01)
(Continued)

(52) U.S. Cl.
CPC ..... *H01M 8/04544* (2013.01); *H01M 8/0247* (2013.01); *H01M 8/0258* (2013.01);
(Continued)

(58) Field of Classification Search
CPC ......... H01M 8/04544; H01M 8/04537; H01M 8/0247; H01M 8/0258; H01M 8/2465;
(Continued)

(56) References Cited

U.S. PATENT DOCUMENTS

| 7,344,792 B2 * | 3/2008 | Barton | H01M 8/0206 |
| | | | 429/465 |
| 7,682,714 B2 * | 3/2010 | Aoto | H01M 8/0247 |
| | | | 429/430 |

(Continued)

FOREIGN PATENT DOCUMENTS

| CN | 102918692 A | 2/2013 |
| CN | 204116432 U | 1/2015 |

(Continued)

OTHER PUBLICATIONS

International Search Report (PCT/ISA/210) issued in PCT Application No. PCT/EP2017/060674 dated Jul. 6, 2017 with English translation (four (4) pages).

(Continued)

*Primary Examiner* — Michael L Dignan
(74) *Attorney, Agent, or Firm* — Crowell & Moring LLP

(57) ABSTRACT

A method for making contact with a plurality of separator plates of a fuel cell system includes the steps of: inserting at least one connecting element of a cell voltage monitoring system between two directly adjacent separator plates so that two connecting parts of the connecting element that are able to move with respect to one another are arranged at least in certain regions between the directly adjacent separator plates; and relatively moving the two connecting parts that are able to move with respect to one another so that at least one first connecting part of the connecting parts moves at least in sections toward a separator plate of the directly adjacent separator plates.

9 Claims, 2 Drawing Sheets

(51) Int. Cl.
  *H01M 8/0247* (2016.01)
  *H01M 8/0258* (2016.01)
  *H01M 8/0202* (2016.01)
(52) U.S. Cl.
  CPC ..... *H01M 8/04537* (2013.01); *H01M 8/2465* (2013.01); *H01M 8/0202* (2013.01); *H01M 8/04552* (2013.01); *Y02P 70/50* (2015.11)
(58) Field of Classification Search
  CPC .. H01M 8/04552; H01M 8/0202; Y02P 70/56
  See application file for complete search history.

(56) References Cited

U.S. PATENT DOCUMENTS

| | | | |
|---|---|---|---|
| 2005/0118481 A1* | 6/2005 | Sakano | H01M 8/0273 429/508 |
| 2006/0030206 A1* | 2/2006 | Zhang | H01R 12/774 439/495 |
| 2008/0003482 A1 | 1/2008 | Komiyama et al. | |
| 2010/0055940 A1* | 3/2010 | Wang | H01R 12/592 439/77 |
| 2012/0270136 A1* | 10/2012 | Mizusaki | H01M 8/0271 429/482 |
| 2015/0044592 A1* | 2/2015 | Terada | H01M 8/04544 429/465 |
| 2015/0280261 A1 | 10/2015 | Horlock et al. | |

FOREIGN PATENT DOCUMENTS

| | | |
|---|---|---|
| CN | 105406010 A | 3/2016 |
| CN | 105406094 A | 3/2016 |
| DE | 10 2004 044 685 A1 | 5/2005 |
| DE | 10 2007 003 506 B4 | 1/2012 |
| GB | 2486180 A | 6/2012 |
| JP | 2006-339100 A | 12/2006 |
| JP | 2008-198429 A | 8/2008 |
| KR | 10-2012-0050132 A | 5/2012 |
| KR | 10-2012-0085537 A | 8/2012 |

OTHER PUBLICATIONS

German-language Written Opinion (PCT/ISA/237) issued in PCT Application No. PCT/EP2017/060674 dated Jul. 6, 2017 (five (5) pages).

German-language Search Report issued in counterpart German Application No. 102016210316.4 dated Jan. 1, 2017 with partial English translation (10 pages).

Chinese Office Action issued in Chinese application No. 201780019790.X dated Dec. 3, 2020, with English translation (Ten (10) pages).

* cited by examiner

METHOD FOR MAKING CONTACT WITH A PLURALITY OF SEPARATOR PLATES AND FUEL CELL SYSTEM

CROSS REFERENCE TO RELATED APPLICATIONS

This application is a continuation of PCT International Application No. PCT/EP2017/060674, filed May 4, 2017, which claims priority under 35 U.S.C. § 119 from German Patent Application No. 10 2016 210 316.4, filed Jun. 10, 2016, the entire disclosures of which are herein expressly incorporated by reference.

BACKGROUND AND SUMMARY OF THE INVENTION

The technology disclosed here relates to a method for making contact with a plurality of separator plates and to a fuel cell system. The technology disclosed here relates, in particular, to the electrical connection of the separator plates of a fuel cell system to a system for monitoring the fuel cells. A cell voltage monitoring system (CVM system) of this kind generally monitors a multiplicity of fuel cells. The individual fuel cells are generally each connected to the CVM system by an electrical line for this purpose.

DE 10 2007 003506 B4 also discloses a plug, which makes contact with individual separator plates of the fuel cells. A multiplicity of contact elements are provided in each plug in turn, which contact elements are each individually crimped to electrical conductors. This is time-consuming and costly. Furthermore, the terminals of the contact elements can apply only a limited clamping force. If terminals with a greater clamping force were provided, said terminals would no longer be able to slide readily onto the separator plates. Damage to the separator plates is then not excluded. The plug forces can likewise become too high. A higher susceptibility to vibrations and increased contact resistances can result from low clamping forces. There is a need, in particular, to connect the many fuel cells to a CVM system in the most cost-effective and failsafe manner possible and/or in the most space-saving manner possible.

It is a preferred object of the technology disclosed here to reduce or to rectify at least one of the disadvantages of the previously known solutions. Further preferred objects can result from the advantageous effects of the technology disclosed here. The object(s) is/are achieved in accordance with embodiments of the invention.

The technology disclosed here relates to a method for making electrical contact with a plurality of separator plates of a fuel cell system.

The technology disclosed here further relates to a fuel cell system having at least one fuel cell. The fuel cell system is intended, for example, for mobile applications, such as motor vehicles, in particular for supplying the energy for at least one drive machine for the purpose of moving the motor vehicle. In its simplest form, a fuel cell is an electrochemical energy converter, which converts fuel and oxidizing agents to reaction products and produces electricity and heat in the process. The fuel cell comprises an anode and a cathode, which are separated by an ion-selective or ion-permeable separator. The anode has a supply for a fuel to the anode. Preferred fuels are: hydrogen, low-molecular-weight alcohol, biofuels, or liquefied natural gas. The cathode has, for example, a feed for oxidizing agents. Preferred oxidizing agents are, for example, air, oxygen and peroxides. The ion-selective separator may be formed, for example, as a proton exchange membrane (PEM). A cation-selective polymer electrolyte membrane is preferably used. Examples of materials for such a membrane are: Nafion®, Flemion® and Aciplex®. A fuel cell system comprises at least one fuel cell and peripheral system components (BOP components), which may be used during the operation of the at least one fuel cell. In general, a plurality of fuel cells are combined to form a fuel cell stack.

The fuel cells of the fuel cell system each generally comprise two separator plates. The ion-selective separator of a fuel cell is arranged in each case between two separator plates. One separator plate forms the anode together with the ion-selective separator. The directly adjacent further separator plate, which is arranged on the opposite side of the ion-selective separator, however, forms the cathode together with the ion-selective separator. Gas channels for fuel or for oxidizing agents are preferably provided in the separator plates. The separator plates can be designed as monopolar plates and/or as bipolar plates. In other words, a separator plate expediently has two sides, wherein one side forms an anode together with an ion-selective separator and the second side forms a cathode together with a further ion-selective separator of an adjacent fuel cell. What are known as gas diffusion layers (GDL) are also generally provided between the ion-selective separators and the separator plates.

The fuel cell system further comprises a cell voltage monitoring system. The cell voltage monitoring system (CVM system) can be designed to monitor the state of at least one cell. In general, said system monitors the state of a multiplicity of fuel cells. In this context, monitoring means that the system can determine the state of the monitored cells directly or indirectly. Degradation that occurs or a cell failure can therefore advantageously be identified at an early stage and appropriate countermeasures can be initiated. As a result, the lifetime can possibly be increased to a certain extent and/or the performance of the cell entity can be increased by way of suitable countermeasures.

Advantageously, at least one measurement variable can be detected directly or indirectly. The measurement variable can be, in particular, the voltage of the monitored cell. The individual cell voltages of a plurality of or all of the cells and the total voltage are advantageously ascertained. The current flowing through the fuel cell stack is also preferably determined.

The cell voltage monitoring system preferably comprises at least one cell voltage monitoring module (FCSC). The cell voltage monitoring module can comprise, for example, an analog-to-digital converter, which converts an analog signal of a fuel cell to a digital signal. For example, the voltage can be detected as analog input signal, which is converted to a digital signal, for example a 12-bit signal. The module can advantageously comprise at least one multiplexer. The multiplexer can be designed to detect the measurement signals of the individual fuel cells of a cell group and then to transmit said analog signals to the analog-to-digital converter. A unit of this kind can be referred to as an analog-to-digital converter module (ADC module), for example. In the case of a fuel cell, it is also possible to speak of a fuel cell supervisory circuit (FCSC). The cell voltage monitoring module can preferably comprise further analysis functionalities of the cell voltage monitoring system, in particular by way of observing difference voltages of directly adjacent separators.

The at least one cell voltage monitoring module is generally connected to at least one control device by means of a databus. Examples of a databus used in this case can be:

serial peripheral interface (SPI), but without chip-select, isoSPI, controller area network (CAN), FlexRay, MOST, local interconnect network (LIN).

The system disclosed here further comprises at least one control device. The control device is designed, inter alia, to communicate with the at least one cell voltage monitoring module (=bus subscriber) by means of the databus. The control device can be designed, inter alia, to regulate and/or to control the cell voltage monitoring process. Said control device may in this case be an engine control unit (ECU). The control device for a fuel cell system can also be referred to as a stack management unit (SMU), for example.

However, the cell voltage monitoring system can also be designed in a different way. For example, it is conceivable for no separate cell voltage monitoring module to be provided and for the cell voltage monitoring system to be connected directly to at least one (preferably all of the) separator plate(s) of the fuel cell system. It is also conceivable for the cell voltage monitoring module and the control device to be integrated into one component. The cell voltage monitoring system could then comprise one or a plurality of such components.

The method disclosed here comprises the step whereby a plurality of separator plates are stacked to form a fuel cell stack or a fuel cell stack of this kind is provided.

The method disclosed here comprises the following step: lateral insertion of at least one connecting element of the cell voltage monitoring system between two directly adjacent separator plates. In each case, two directly adjacent separator plates form the intermediate space Z together with the seal, which is likewise arranged between the separator plates.

The directly adjacent separator plates are the separator plates that are arranged directly next to one another in the fuel cell stack. The at least one connecting element can be, for example, an electrical line or a pin secured to a printed circuit board, a printed circuit board and/or a flexible conductor printed circuit board, which comprises the connecting parts that are able to move with respect to one another disclosed here. The connecting element disclosed here is designed to establish electrical contact with the separator plate. To this end, the connecting element is connected or can be connected directly or indirectly to the cell voltage monitoring system. In particular, the at least one connecting element is inserted between the edge regions B of two adjacent separator plates of the fuel cell stack. After the insertion of the at least one connecting element, two connecting parts of the connecting element that are able to move with respect to one another are arranged at least in certain regions between the directly adjacent separator plates. The two connecting parts that are able to move with respect to one another form the part of the connecting element that can be inserted between the separator plates.

The method disclosed here further comprises the following step: relative movement of the two connecting parts that are able to move with respect to one another so that at least one first connecting part of the connecting parts moves at least in sections toward a separator plate of the directly adjacent separator plates. If the connecting element or the connecting parts can be inserted into the intermediate spaces formed by the directly adjacent separator plates with a sufficient clearance (that is to say in a substantially contactless manner), the relative movement of the two connecting parts that are able to move with respect to one another leads to at least one connecting part (preferably both connecting parts) moving toward the separator plates adjacent to one another.

As an alternative or in addition, the method disclosed here comprises the following step: relative movement of the two connecting parts that are able to move with respect to one another so that the contact pressure at least between one of the connecting parts and one of the directly adjacent separator plates is increased at least in sections due to the relative movement. If the connecting element or the connecting parts contact the directly adjacent separator plates as early as during the insertion into the intermediate spaces of the separator plates, the relative movement of the two connecting parts that are able to move with respect to one another causes at least an increase in the force with which the connecting element makes contact with at least one separator plate. In other words, the relative movement thus causes the clamping force with which the connecting element is clamped or wedged into the intermediate space of the two directly adjacent separator plates to increase.

The relative movement can comprise the following step: wedging or spreading apart of the connecting parts of the connecting element that are able to move with respect to one another between the two directly adjacent separator plates.

The relative movement expediently follows the insertion. It is likewise conceivable for the relative movement to have already begun before the insertion of the connecting element has completely finished.

The relative movement particularly preferably comprises the following step: displacement of the two connecting parts that are able to move with respect to one another relative to one another. In particular, said displacement takes place at a time at which the two connecting parts are arranged at least in certain regions inside the intermediate space of the directly adjacent separator plates. The connecting parts that are able to move with respect to one another are advantageously displaced in parallel with the insertion direction E of the connecting element. The separator plates are substantially of flat design. The insertion direction E is expediently a direction perpendicular to the outer edge of the separator plate and parallel to the plane that spans the separator plate.

At least one connecting part can have at least one sliding surface, which extends at an angle to the insertion direction E. The relative movement can comprise the following step: sliding along the sliding surface at least in sections. The connecting parts are pushed apart at least in certain regions due to the sliding-along. In other words, at least one of the connecting parts, preferably both connecting parts, can have a wedge-shaped section along which a corresponding section of the other connecting part slides. Said sliding-along causes the connecting parts to move away from one another and toward the separator plates. The connecting parts are in this case configured so that they press at least in sections against the walls of the adjacent separator plates due to the displacement of the connecting parts. As a result, higher clamping forces can advantageously be realized. The susceptibility to vibrations can be reduced and the contact resistance can be improved.

A plurality of connecting elements are preferably inserted in each case between two directly adjacent separator plates, wherein the plurality of connecting elements each have two connecting parts that are able to move with respect to one another. Particularly preferably, all of the connecting elements can thus be inserted between all of the separator plates, but this does not have to be the case.

The technology disclosed here relates, in particular, to a fuel cell system having a plurality of separator plates and having at least one connecting element for connection of the separator plates to the cell voltage monitoring system disclosed here. In a first state of the connecting element, the connecting element can be inserted between the two directly adjacent separator plates. Moreover, in a second state of the connecting element, the connecting element exerts a higher contact pressure on at least one of the adjacent separator plates at least in certain regions than in the first state. In particular, the connecting element can be configured so that, in the first state, it can be inserted into the intermediate space formed by two directly adjacent separator plates with clearance or with a slight press fit. If the connecting element is inserted in the first state with clearance, the contact pressure is 0 bar. If the connecting element is pressed into the intermediate space in the first state, the contact pressure produced between the connecting element and at least one separator plate is greater than 0 bar. The connecting element can be transferred from the first state to the second state by virtue of two connecting parts of the connecting element that are able to move with respect to one another moving relative to one another. In particular, the two connecting parts that are able to move with respect to one another can be configured to perform the relative movement, which will be explained in connection with the methods disclosed here.

According to the technology disclosed here, the connecting parts can have contact surfaces, which, in the second state, make contact with the directly adjacent separator plates. In the second state, the contact surfaces of the connecting parts are spaced further apart from one another in a direction perpendicular to the insertion direction E than in the first state. One of the contact surfaces is preferably formed from an electrically conductive material whereas the other contact surface is formed from an electrically insulating material.

An insertion aid can preferably be provided at the free end of the connecting element that can be inserted into the intermediate space. In particular, an end that comes to a point or tapers can be provided.

In other words, the technology disclosed here relates to a CVM connection without a contact part. The connection to the CVM system can be, for example, a line, a printed circuit board, a flexible conductor printed circuit board or a pin soldered onto a printed circuit board, which makes direct contact with the fuel cell. One possible design variant is illustrated below. In this case, the line is pressed against the fuel cell by a wedge that is pushed between the line and the fuel cell. The CVM system can advantageously be electrically connected to the fuel cells without a contact part.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
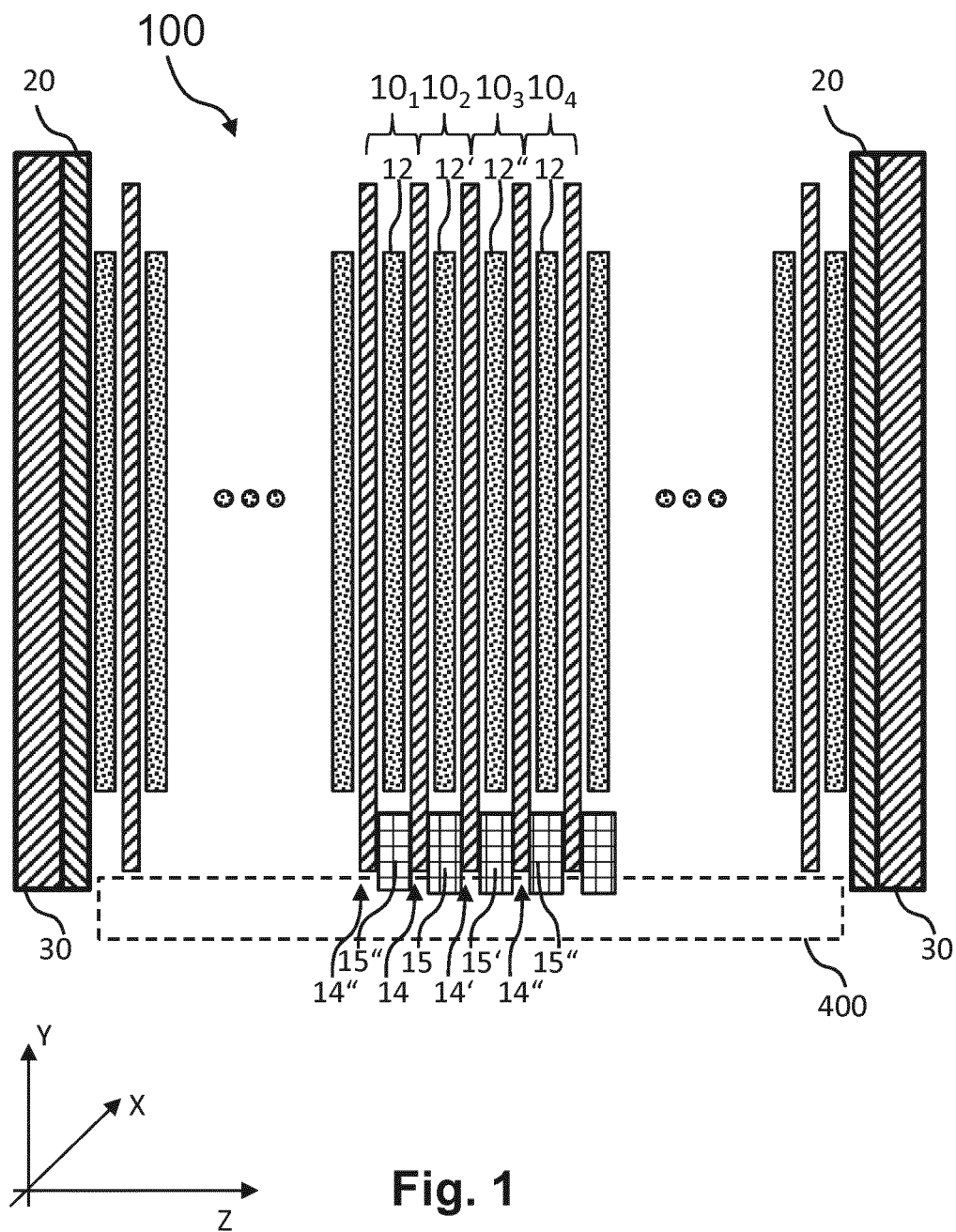
FIG. 1 is a schematic illustration of a fuel cell system 100.

FIG. 1 schematically shows a fuel cell stack of a fuel cell system 100 having a plurality of individual cells, of which in this case the individual cells $10_1$, $10_2$, $10_3$, $10_4$ are shown by way of example. The individual cells are held and prestressed by two end plates 30. Current collectors 20 are provided adjacent to the end plates 30. The separator plates are designed in this case as bipolar plates 14, 14', 14". In each case, one half of two directly adjacent bipolar plates 14, 14', 14" form an individual cell $10_1$, $10_2$, $10_3$, $10_4$ together with a membrane electrode assembly (MEA) 12, 12', 12" arranged between said plates. The bipolar plates 14, 14', 14" shown are connected to a cell voltage monitoring system 400, which is designed to monitor the state of the individual cells $10_1$, $10_2$, $10_3$, $10_4$. The connecting elements 15, 15', 15" are in this case illustrated only schematically and in a highly simplified manner. The connecting elements 15, 15', 15" ensure the electrical contact between the cell voltage monitoring system and the separator plates. In particular, the connecting elements 15, 15', 15" are each clamped between two directly adjacent separator plates. The connecting elements 15, 15', 15" are in this case connected directly to electronics components of the CVM system 400. For example, the connecting elements could be designed as contact pins or a printed circuit board or a flexible conductor printed circuit board, which make direct contact with a printed circuit board of the CVM system 400.

Figure 2:
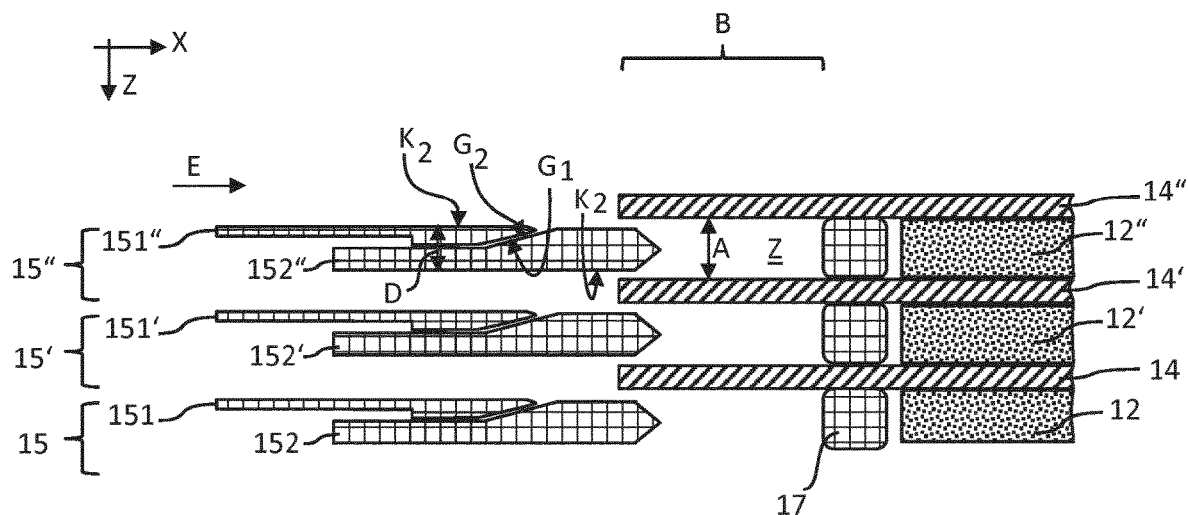
FIG. 2 is a schematic illustration of the separator plates 14, 14', 14" and the connecting elements 15, 15', 15" in the first state.

FIG. 2 shows a connecting element 15, 15', 15" disclosed here in the first state. The connecting element 15, 15', 15" comprises two connecting parts 151, 152; 151', 152'; 151", 152" that are able to move with respect to one another, which connecting parts are designed here so as to be displaceable along the longitudinal axis of the connecting element 15, 15', 15" and along the insertion direction E. For simplification, the displacement mechanism itself has been omitted here. The first connecting part 151, 151', 151" is located directly next to the second connecting part 152, 152', 152" of the connecting element 15, 15', 15". The second connecting part 152, 152', 152" comprises a free end that comes to a point in this case (not absolutely necessary), which end can be inserted into the intermediate space Z. The other end of the connecting element 15, 15', 15" can be connected directly or indirectly to the cell voltage monitoring system 400 (not illustrated). A widened region with the contact surface $K_2$ follows counter to the insertion direction E behind the free end that comes to a point. A hollow region follows said widened region of the second connecting part 152, 152', 152" counter to the insertion direction E, gradually tapers and is received in the first connecting part 151, 151', 151" in the first state of the connecting element. Said gradually tapering transition region is the sliding surface $G_2$ along which the first connecting part 151, 151', 151" can slide. The sliding surface $G_2$ runs at an angle to the longitudinal axis of the connecting element 15, 15', 15" and to the insertion direction E.

The first connecting part 151, 151', 151" also comprises a sliding surface $G_1$, which in this case is expediently designed in a manner corresponding to the sliding surface $G_2$ of the second connecting part 152, 152', 152". The first connecting part 151, 151', 151" and the second connecting part 152, 152', 152" are configured so that the first connecting part 151, 151', 151" can be received at least in certain regions, preferably completely, in the recess of the second connecting part 152, 152', 152". The connecting element 15, 15', 15" is designed, in particular, in such a way that, in the first state, the maximum thickness D of the section of the connecting element 15, 15', 15" that can be inserted into the intermediate space Z is less than or equal to the minimum spacing A of two adjacent separator plates. The connecting element 15, 15', 15" can therefore be inserted in a simple or in a simpler manner in the first state. The risk of faulty contact-connections can possibly be reduced as well.

Figure 3:
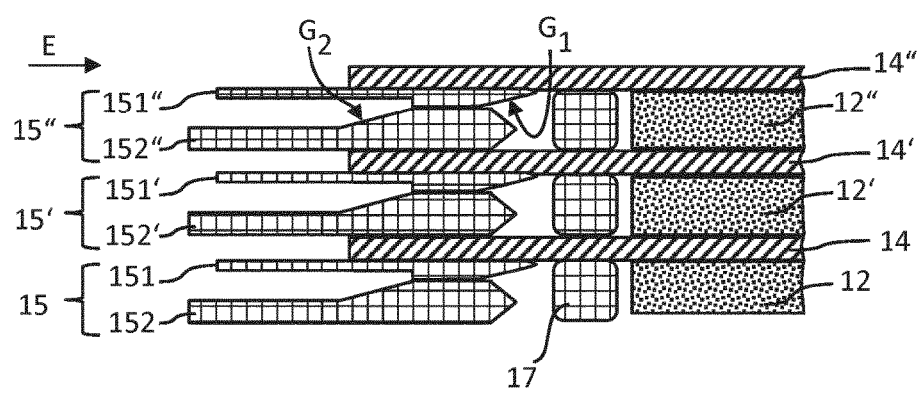
FIG. 3 is a schematic illustration of the separator plates 14, 14', 14" and the connecting elements 15, 15', 15" in the second state.

FIG. 3 shows the connecting element 15, 15', 15" and the separator plates 14, 14', 14" in the second state of the connecting element 15, 15', 15". The two connecting parts have been displaced relative to one another in parallel with (that is to say in or counter to) the insertion direction E. In this case, the sliding surfaces $G_1$, $G_2$ act as guides. The contact surfaces $K_1$, $K_2$ have been moved apart from one another due to the relative displacement of the two connecting parts and now press against the separator plates. Relatively large contact pressures are achieved here.

For reasons of legibility, the expression "at least one" has sometimes been omitted for simplification. If a feature of the technology disclosed here is described in the singular or with the indefinite article (for example the/a fuel cell, the/a connecting element, the/a connecting part, the/a separator plate, the/a contact surface, the/a recess, the/a sliding surface, etc.), the plural thereof is also intended to be disclosed concomitantly at the same time (for example the at least one fuel cell, the at least one connecting element, the at least one connecting part, the at least one separator plate, the at least one contact surface, the at least one recess, the at least one sliding surface, etc.).

The preceding description of the present invention serves only for illustrative purposes and not for the purpose of restricting the invention. Various alterations and modifications are possible in the context of the invention without departing from the scope of the invention and of its equivalents.

LIST OF REFERENCE SIGNS

Fuel cell $10_1$, $10_2$, $10_3$, $10_4$
MEA 12, 12', 12"
Separator plate 14, 14', 14"
Connecting element 15, 15', 15"
First connecting part 151, 151', 151"
Second connecting part 152, 152', 152"
Seal 17
Current collector 20
End plates 30
Fuel cell system 100
Cell voltage monitoring system 400
Connecting element thickness D
Separator plate spacing A
Edge R
Contact surface $K_1$, $K_2$
Sliding surface $G_1$, $G_2$ The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for making contact with a plurality of separator plates of a fuel cell system, the method comprising the steps of:
    inserting at least one connecting element of a cell voltage monitoring system between two directly adjacent separator plates so that two connecting parts of the connecting element that are able to slidingly move with respect to one another are arranged at least in certain regions between the directly adjacent separator plates, wherein the two connecting parts of the connecting element comprise a first part and a second part and wherein the first part is not monolithically formed with the second part; and
    relatively slidingly moving the two connecting parts that are able to slidingly move with respect to one another such that the first part of the two connecting parts slidingly moves along a sliding surface of the second part which extends at an angle to an insertion direction toward a separator plate of the directly adjacent separator plates wherein the two connecting parts are pushed apart at least in certain regions due to the slidingly moving along.

2. The method as claimed in claim 1, wherein
the connecting parts that are able to slidingly move with respect to one another are displaced in parallel with the insertion direction of the connecting element.

3. The method as claimed in claim 1, wherein
the connecting parts that are able to slidingly move with respect to one another are configured so as to be displaceable along a longitudinal axis of the connecting element.

4. The method as claimed in claim 1, wherein
a plurality of connecting elements are each inserted between two directly adjacent separator plates, and
the plurality of connecting elements each have two connecting parts that are able to slidingly move with respect to one another.

5. The method as claimed in claim 1, wherein the relatively slidingly moving is begun only after the insertion.

6. The method as claimed in claim 1, wherein
contact pressure at least between one of the connecting parts and one of the directly adjacent separator plates is increased at least in sections due to the relatively slidingly moving.

7. A fuel cell system, comprising:
    a plurality of separator plates; and
    at least one connecting element for connection of the separator plates to a cell voltage monitoring system;
    wherein, in a first state, the connecting element is insertable between two directly adjacent separator plates; and
    wherein, in a second state, the connecting element exerts a higher contact pressure on at least one of the adjacent separator plates at least in certain regions than in the first state; and
    wherein the connecting element is transferrable from the first state to the second state by virtue of two connecting parts of the connecting element that are able to slidingly move with respect to one another slidingly moving relative to one another, wherein the two connecting parts of the connecting element comprise a first part and a second part, wherein the first part is not monolithically formed with the second part, and wherein the slidingly moving relative to one another comprises the first part slidingly moving along a sliding surface of the second part which extends at an angle to an insertion direction such that the two connecting parts are pushed apart at least in certain regions due to the slidingly moving along.

8. The fuel cell system as claimed in claim 7, wherein
the connecting parts that are able to slidingly move with respect to one another are displaceable in parallel with the insertion direction of the connecting element.

9. The fuel cell system as claimed in claim 7, wherein
the connecting parts that are able to slidingly move with respect to one another are configured so as to be displaceable along a longitudinal axis of the connecting element.

* * * * *